(12) United States Patent
Yugawa

(10) Patent No.: US 6,233,272 B1
(45) Date of Patent: May 15, 2001

(54) SPREAD SPECTRUM COMMUNICATION RECEIVER

(75) Inventor: Takahiro Yugawa, Yokohama (JP)

(73) Assignee: YRP Mobile Telecommunications Key Technology Research Laboratories Co., Ltd., Kanagawa (JP)

(*) Notice: Subject to any disclaimer, the term of this patent is extended or adjusted under 35 U.S.C. 154(b) by 0 days.

(21) Appl. No.: 08/816,564

(22) Filed: Mar. 13, 1997

(30) Foreign Application Priority Data

Mar. 19, 1996 (JP) .................................................. 8-089023
Nov. 18, 1996 (JP) .................................................. 8-321155

(51) Int. Cl.$^7$ ...................................................... H04B 3/16
(52) U.S. Cl. ............................................................. 375/148
(58) Field of Search ..................................... 375/232, 233, 375/148, 144; 370/206, 342, 479

(56) References Cited

U.S. PATENT DOCUMENTS

| | | | |
|---|---|---|---|
| 4,853,772 | * | 8/1989 | Kikuchi ................................... 348/71 |
| 5,151,919 | * | 9/1992 | Dent ...................................... 370/209 |
| 5,550,810 | * | 8/1996 | Monogioudis et al. ............. 375/144 |
| 5,790,549 | * | 8/1998 | Dent ...................................... 370/479 |
| 5,805,639 | * | 9/1998 | Tonch et al. ......................... 375/232 |
| 5,862,173 | * | 1/1999 | Dent ...................................... 375/206 |
| 5,894,473 | * | 4/1999 | Dent ...................................... 370/342 |

FOREIGN PATENT DOCUMENTS

| | | | |
|---|---|---|---|
| 5291972 | 11/1993 | (JP) | ................................ H04B/1/10 |
| 7030514 | 1/1995 | (JP) | ................................ H04J/13/10 |
| 5068017 | 3/1995 | (JP) | ................................ H04J/13/00 |
| 9512262 | 5/1995 | (WO) | ............................ H04J/13/00 |
| 9534140 | 12/1995 | (WO) | ............................ H04B/1/69 |

* cited by examiner

Primary Examiner—Chi Pham
Assistant Examiner—Kevin M Burd
(74) Attorney, Agent, or Firm—Ladas & Parry

(57) ABSTRACT

A spread spectrum communication receiver includes a transmission path state estimating unit which estimates states of paths from a received signal, and demodulator units independently performing demodulation processes on signals propagated through the respective paths. A symbol combiner combines output signals of the demodulator units. A decision unit is directly or indirectly coupled to the symbol combiner and makes a decision on an output signal of the symbol combiner. An unnecessary component eliminating unit eliminates a component of a first symbol which is an unnecessary component that is propagated through one of the paths and overlaps with a received component of a second symbol to be demodulated, so that the unnecessary component has been eliminated from the output signal of the decision unit.

12 Claims, 13 Drawing Sheets

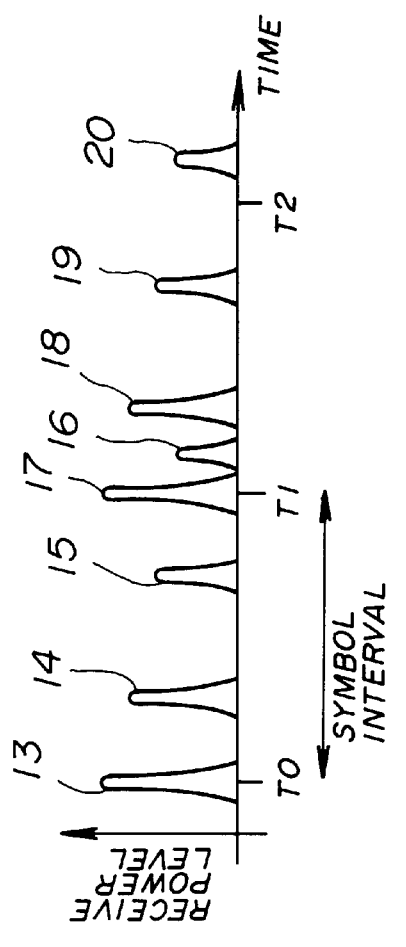
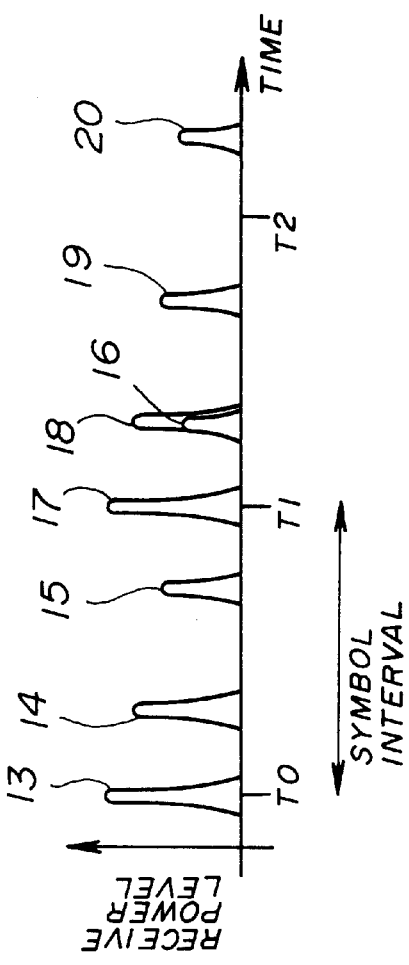
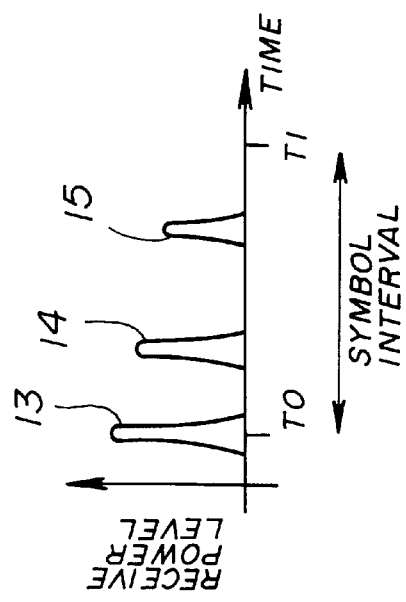

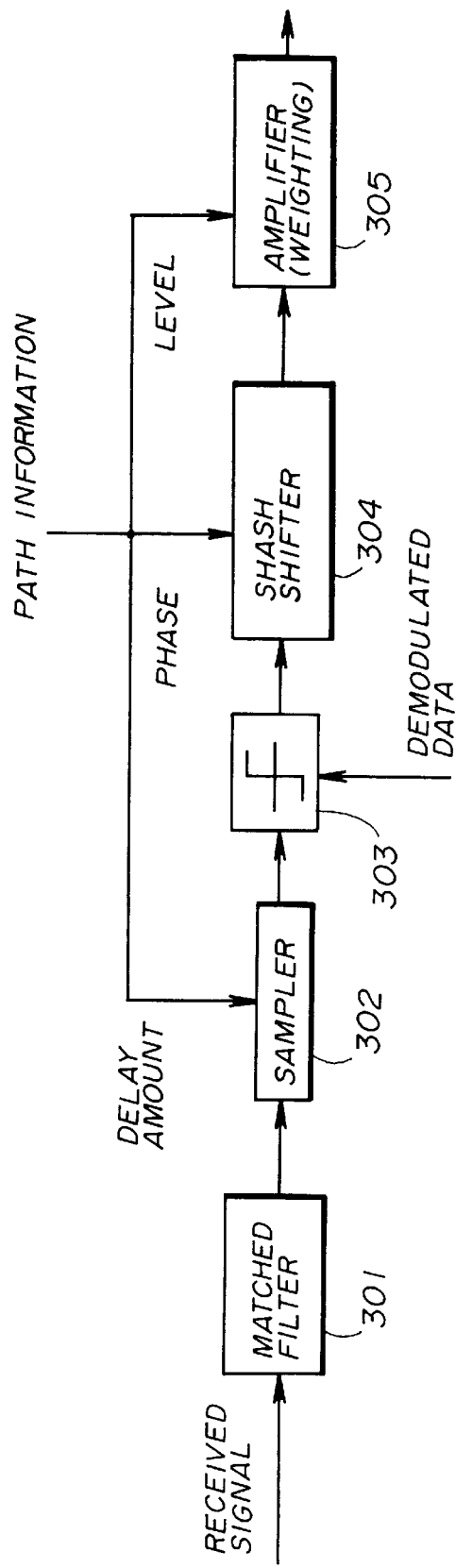

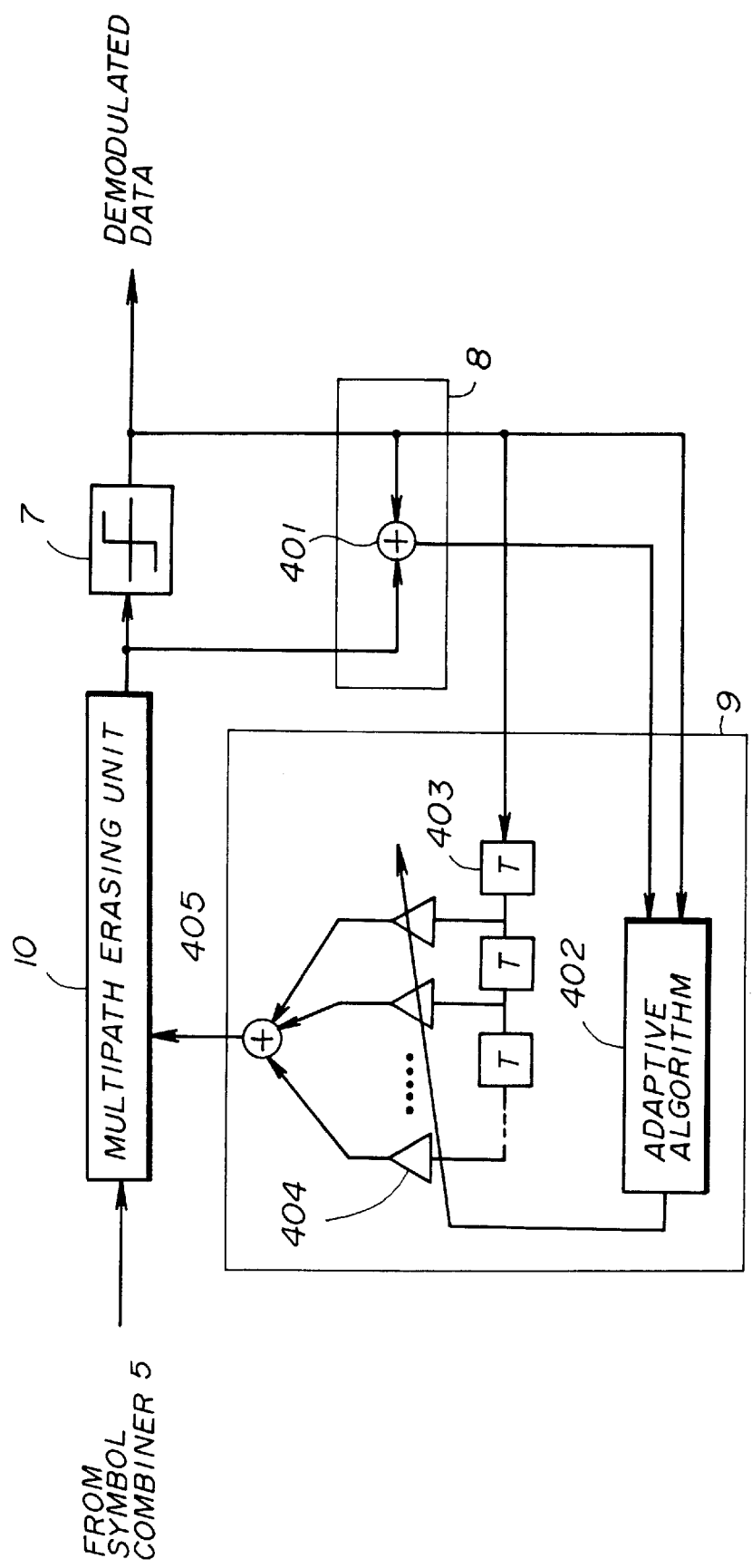

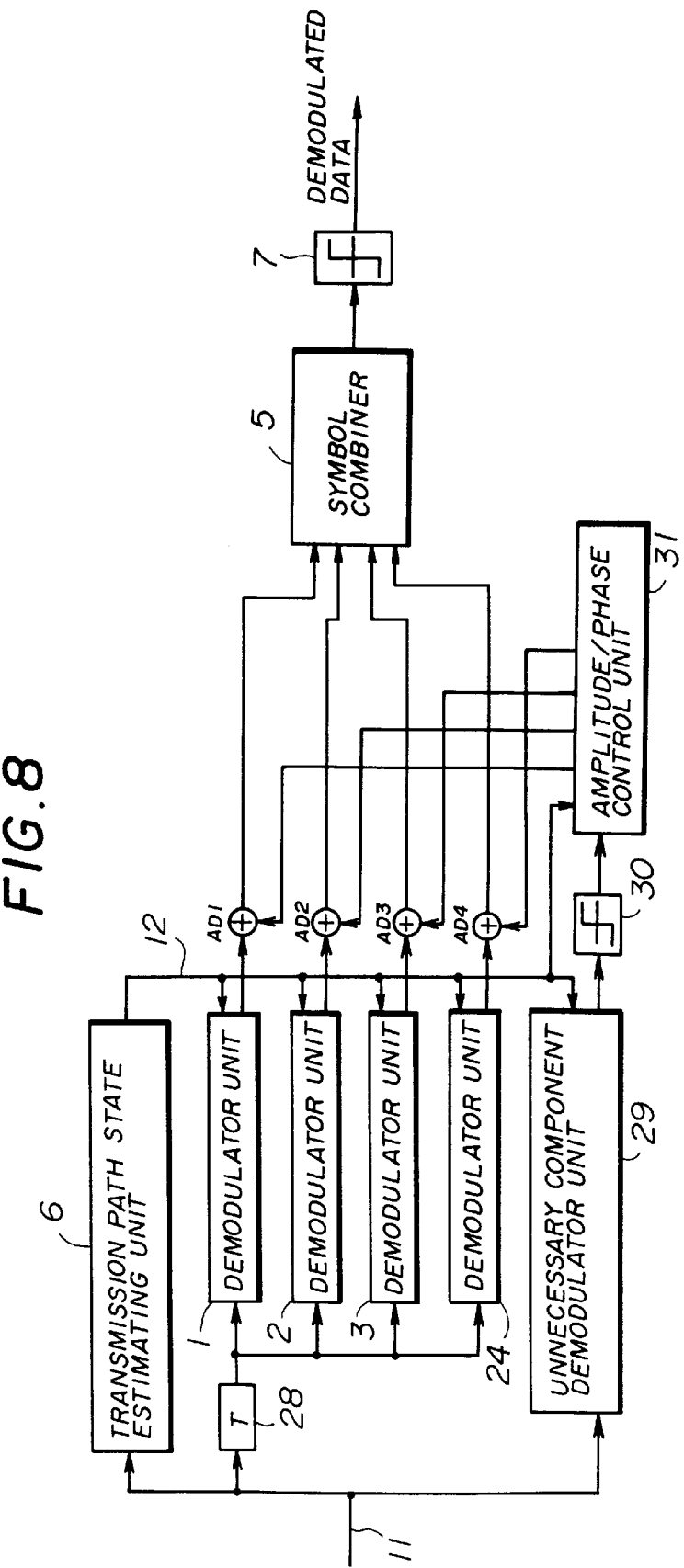

SPREAD SPECTRUM COMMUNICATION RECEIVER

BACKGROUND OF THE INVENTION

1. Field of the Invention

The present invention relates to spread spectrum communication receivers, and more particularly to a spread spectrum communication receiver which is suitable for mobile communications and is capable of demodulating received signals which have been distorted during propagations of multiple paths.

2. Description of the Related Art

Recently, there has been considerable activity in the research and development of a communication system using a spread spectrum communication system and a CDMA (Code Division Multiple Access) communication system which is a multiple access system utilizing the spread spectrum communication system. These communication systems are not liable to be affected by interference, disturbance and multipath propagations. A so-called RAKE receiver which combines multipath transmissions can be used in the above system, so that diversity can be obtained. Hence, the above systems are attractive as applications to mobile communications.

A spread spectrum communication receiver including a RAKE receiver will be described.

FIG. 1 is a block diagram of such a conventional spread spectrum communication receiver. The receiver includes demodulator units 1, 2 and 3, a symbol combiner 5, a transmission path state estimating unit 6, and a decision unit 7. The demodulator units 1, 2 and 3 perform respective demodulation processes on a received signal 11 in mutually independent phases. The symbol combiner 5 pulls the demodulated signals from the demodulation units 1, 2 and 3 in phase, and them combines the demodulated signals. The transmission path state estimating unit 6 estimates the states of multiple transmission paths (main lobes), and supplies the demodulator units 1, 2 and 3 with phase information indicative of the phases of the multiple paths obtained by the estimating unit 6.

FIG. 2A shows demodulation timings of the demodulator units 1 through 3. FIG. 2A shows transmission (propagation) paths (main lobes) 13, 14 and 15 and a correlation therebetween. The receive power levels of the signals respectively propagated through the paths 13, 14 and 15 have respective delay times.

The operation of the spread spectrum communication receiver shown in FIG. 1 will be described below.

The transmission path state estimating unit 6 estimates the states of the transmission paths from the received signal 11. More particularly, the estimating unit 6 measures the correlation levels in the phases of spreading codes respectively used in the demodulator units 1, 2 and 3, and thus obtains the receive power levels of the signals propagated through the paths 13, 14 and 15. The information concerning the phases and receive power levels is applied to the demodulator units 1, 2 and 3 as information 12.

The demodulator units 1 through 3 perform the demodulation processes in synchronism with the phases of the paths 13, 14 and 15 estimated by the estimating unit 6. The receiver shown in FIG. 1 has three demodulator units 1, 2 and 3, which thus perform the demodulation processes on the received signals in synchronism with the phases of the paths 13, 14 and 15, respectively. The demodulated signals output by the demodulator units 1, 2 and 3 are combined together in a maximum ratio fashion. A decision on the resultant combined signal is made by the decision unit 7, which then outputs the demodulated data.

The transmission path state estimating unit 6 provides the demodulator units 2 and 3 with relative phase difference information concerning the paths 14 and 15 with respect to the path 13. Hence, the demodulation processes of the demodulators 2 and 3 can be pulled in phase with the signals propagated through the paths 14 and 15.

However, the above conventional spread spectrum communication receiver has the following disadvantages, which will be encountered when there is a signal which is propagated through a path having a delay time longer than the symbol interval and which overlaps with a signal of the next symbol propagated through a path having a relatively small delay time.

FIG. 2B shows a path 16 located in the next symbol interval. The path 16 has a delay time longer than the symbol interval. The path 16 shown in FIG. 2B does not overlap with any path located in the next symbol interval. In this case, the spread spectrum communication receiver can demodulate the symbol from the signals propagated through the paths 13, 14 and 15 and the symbol from the signals propagated through paths 17, 18 and 19.

FIG. 2C shows that the path 16 overlaps with the path 18 in the next symbol interval. The conventional receiver does not discriminate the signals respectively propagated through the paths 16 and 18 from each other. Hence, the signal propagated through the path 16 functions as noise when the signal propagated through the path 18 is demodulated in the next symbol interval. This degrades the reception performance of the receiver.

SUMMARY OF THE INVENTION

It is a general object of the present invention to provide a spread spectrum communication receiver in which the above disadvantages are eliminated.

A more specific object of the present invention is to provide a spread spectrum communication receiver capable of performing the demodulation process without a degradation of the reception performance of the receiver even if paths located in different symbol intervals overlap with each other.

The above objects of the present invention are achieved by a spread spectrum communication receiver comprising: a transmission path state estimating unit which estimates states of paths from a received signal; demodulator units independently performing demodulation processes on signals propagated through the respective paths; a symbol combiner combining output signals of the demodulator units; a decision unit which is directly or indirectly coupled to the symbol combiner and makes a decision on an output signal of the symbol combiner; and an unnecessary component eliminating unit eliminating a component of a first symbol which is an unnecessary component that is propagated through one of the paths and overlaps with a received component of a second symbol to be demodulated, so that the unnecessary component has been eliminated from the output signal of the decision unit.

The above spread spectrum communication receiver may be configured so that the unnecessary component eliminating unit comprises: an unnecessary component demodulator unit demodulating the unnecessary component by referring to estimated states of the paths and the output signal of the decision unit; and an erasing unit subtracting an output signal of the unnecessary component demodulator unit from the output signal of the symbol combiner.

The above spread spectrum communication receiver may be configured so that the unnecessary component eliminating unit comprises: a receive quality measuring unit measuring a receive quality by using an output signal of an erasing unit and the output signal of the decision unit; a control unit generating a replica of the unnecessary component by using the output signal of the decision unit and the receive quality measured by the receive quality measuring unit; and the above erasing unit subtracting the replica generated by the control unit from the output signal of the symbol combiner.

The above spread spectrum communication receiver may be configured so that the unnecessary component eliminating unit comprises: an unnecessary component demodulator unit demodulating the unnecessary component by referring to estimated states of the paths and the output signal of the decision unit; a receive quality measuring unit measuring a receive quality by using an output signal of an erasing unit and the output signal of the decision unit; a control unit generating a replica of the unnecessary component by using the output signal of the decision unit and the receive quality measured by the receive quality measuring unit; and the above erasing unit subtracting, from the output signal of the symbol combiner, the replica generated by the control unit and an output signal of the unnecessary component demodulator unit.

The above spread spectrum communication receiver may be configured so that the first symbol of the unnecessary component leads, on a time basis, the second symbol of the received component to be demodulated.

The above spread spectrum communication receiver may further comprise a delay unit which delays the received signal by a given delay time and applies a delayed received signal to the demodulator units. In this case, the unnecessary component eliminating unit may comprise: an unnecessary component demodulator unit directly receiving the received signal and demodulating the unnecessary component included therein by referring to estimated states of the paths; a provisional decision unit which makes a provisional decision on an output signal of the unnecessary component demodulator unit; a control unit generating a replica of the unnecessary component by using an output signal of the provisional decision unit and the estimated states of the paths; and an erasing unit subtracting the replica generated by the control unit from the output signals of the demodulator units.

The above spread spectrum communication receiver may be configured so that the given delay time is equal to at least one symbol interval.

The spread spectrum communication receiver may further comprise a first delay unit which delays the received signal by a given delay time and applies a delayed received signal to the demodulator units. In this case, the unnecessary component eliminating unit may comprise: first through (n−1)th delay units that respectively delay the received signal by respective given delay times, where n is an integer, and an ith delay unit (i=1, 2, . . . , (n−1)) has a delay time equal to i times a symbol interval; a first unnecessary component demodulator unit directly receiving the received signal and demodulating an unnecessary component included therein by referring to estimated states of the paths; second through nth unnecessary component demodulator units respectively receiving the received signal via the first through (n−1)th delay units and demodulating unnecessary components included in the received signal by referring to estimated states of the paths; n provisional decision units which make provisional decisions on output signals of the first through nth unnecessary component demodulator units; a control unit generating replicas of the unnecessary components by using output signals of the n provisional decision units and the estimated states of the paths; and an erasing unit subtracting the replicas generated by the control unit from the output signals of the demodulator units. In the above case, the given delay time may be equal to n times the symbol interval.

The spread spectrum communication receiver may be configured so that the first symbol of the unnecessary component lags, on a time basis, behind the second symbol of the received component to be demodulated.

The spread spectrum communication receiver may further comprise a delay unit which delays the received signal by a given delay time and applies a delayed received signal to the demodulator units. In this case, the unnecessary component eliminating unit may comprise: a first unnecessary component demodulator unit demodulating a first unnecessary component by referring to estimated states of the paths and the output signal of the decision unit; a first erasing unit subtracting an output signal of the first unnecessary component demodulator unit from the output signal of the symbol combiner; a second unnecessary component demodulator unit directly receiving the received signal and demodulating a second unnecessary component included therein by referring to the estimated states of the paths; a provisional decision unit which makes a provisional decision on an output signal of the second unnecessary component demodulator unit; a control unit generating a replica of the second unnecessary component by using an output signal of the provisional decision unit and the estimated states of the paths; and a second erasing unit subtracting the replica generated by the control unit from the output signals of the demodulator units.

The spread spectrum communication receiver may further comprise a delay unit which delays the received signal by a given delay time and applies a delayed received signal to the demodulator units. In this case, the unnecessary component eliminating unit may comprise: a receive quality measuring unit measuring a receive quality by using an output signal of a first erasing unit and the output signal of the decision unit; a first control unit generating a replica of a first unnecessary component by using the output signal of the decision unit and the receive quality measured by the receive quality measuring unit; the above first erasing unit subtracting the replica generated by the first control unit from the output signal of the symbol combiner; an unnecessary component demodulator unit directly receiving the received signal and demodulating a second unnecessary component included therein by referring to estimated states of the paths; a provisional decision unit which makes a provisional decision on an output signal of the unnecessary component demodulator unit; a second control unit generating a replica of the second unnecessary component by using an output signal of the provisional decision unit and the estimated states of the paths; and a second erasing unit subtracting the replica generated by the second control unit from the output signals of the demodulator units.

The spread spectrum communication receiver may further comprise a delay unit which delays the received signal by a given delay time and applies a delayed received signal to the demodulator units. In this case, the unnecessary component eliminating unit may comprise: a first unnecessary component demodulator unit demodulating a first unnecessary component by referring to estimated states of the paths and the output signal of the decision unit; a receive quality measuring unit measuring a receive quality by using an output signal of a first erasing unit and the output signal of the decision unit; a first control unit generating a replica of the first unnecessary component by using the output signal of the decision unit and the receive quality measured by the receive quality measuring unit; the above first erasing unit subtracting, from the output signal of the symbol combiner, the replica generated by the first control unit and an output signal of the first unnecessary component demodulator unit; a second unnecessary component demodulator unit directly receiving the received signal and demodulating a second unnecessary component included therein by referring to the estimated states of the paths; a provisional decision unit which makes a provisional decision on an output signal of the second unnecessary component demodulator unit; a second control unit generating a replica of the second unnecessary component by using an output signal of the provisional decision unit and the estimated states of the paths; and a second erasing unit subtracting the replica generated by the second control unit from the output signals of the demodulator units.

BRIEF DESCRIPTION OF THE DRAWINGS

Other objects, features and advantages of the present invention will become more apparent from the following detailed description when read in conjunction with the accompanying drawings, in which:

FIGS. 2A, 2B and 2C are graphs of multipath propagations;

FIG. 6 is a block diagram of an unnecessary component demodulating unit used in the first and third embodiments of the present invention;

FIG. 7 is a block diagram of a receive quality measuring unit and an amplitude/phase control unit used in the first and third embodiments of the present invention;

FIG. 8 is a block diagram of a spread spectrum communication receiver according to a second embodiment of the present invention;

DETAILED DESCRIPTION

Figure 3:
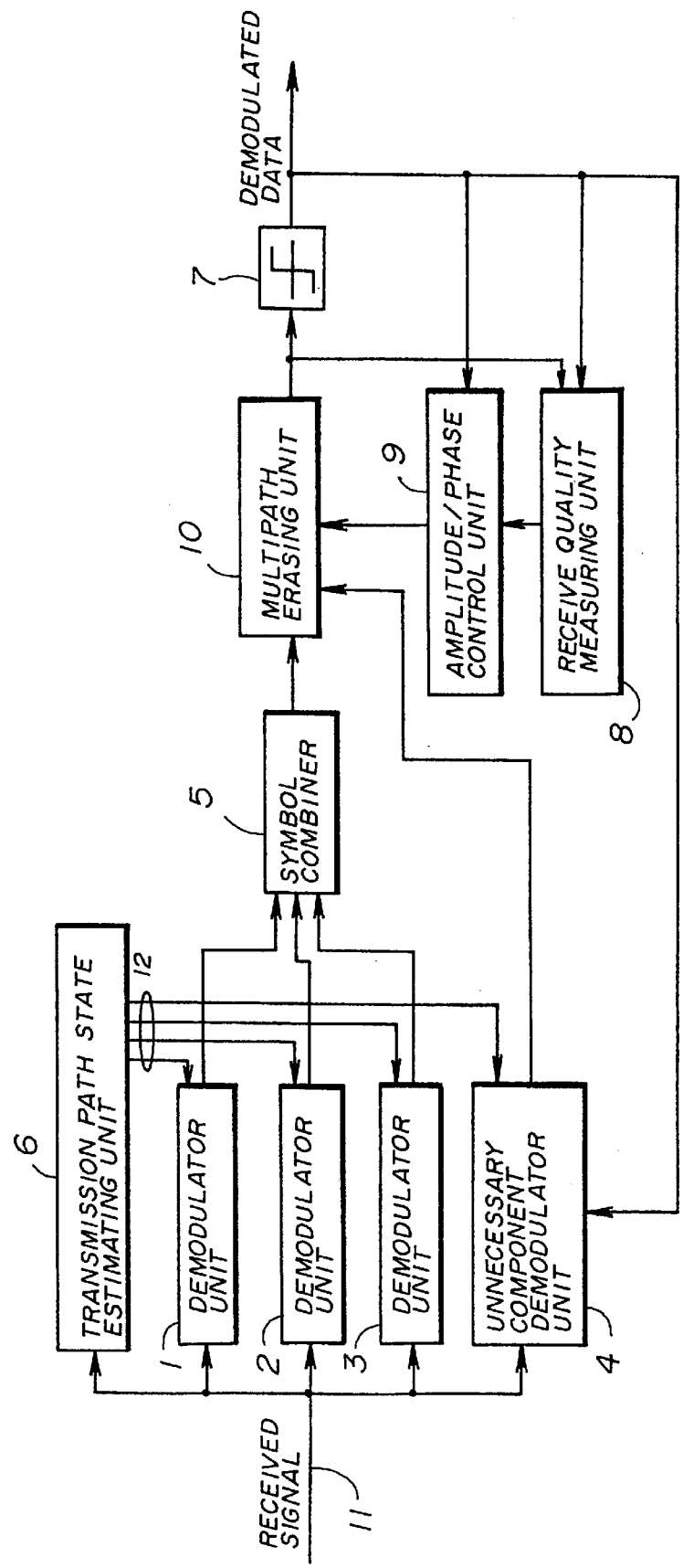
FIG. 3 is a block diagram of a spread spectrum communication receiver according to a first embodiment of the present invention.

A description will now be given, with reference to FIG. 3, of a spread spectrum communication receiver according to a first embodiment of the present invention. In FIG. 3, parts that are the same as those shown in FIG. 1 are given the same reference numbers.

Figure 1:
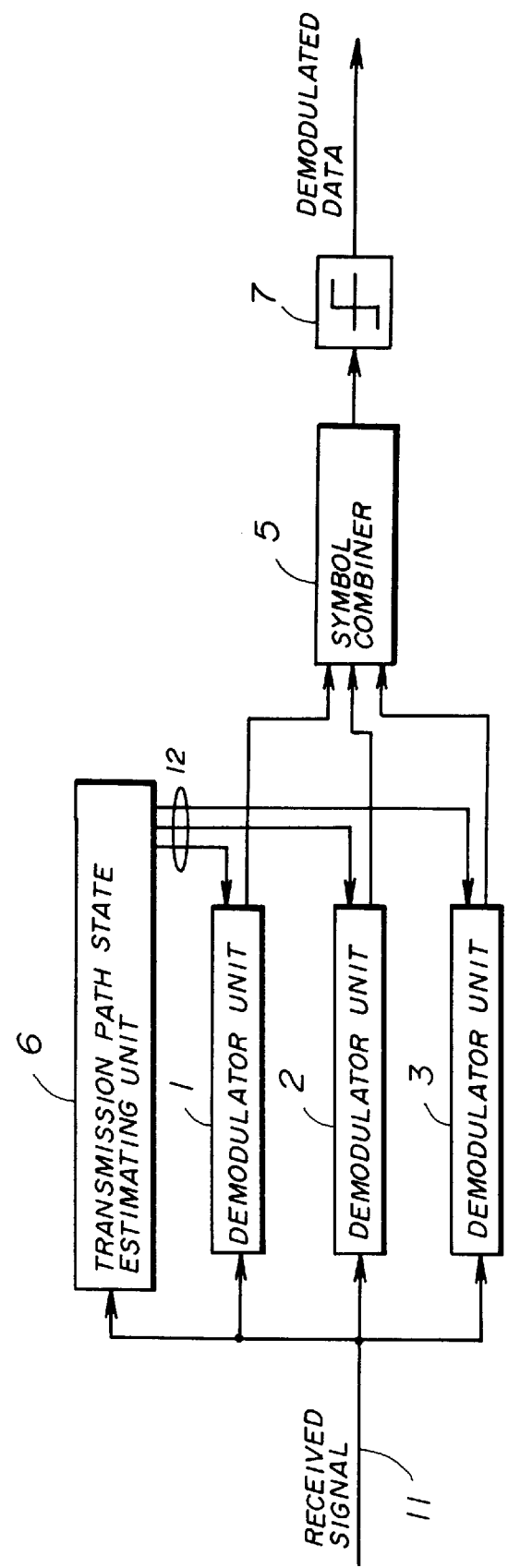
FIG. 1 is a block diagram of a conventional spread spectrum communication device.

The spread spectrum communication receiver shown in FIG. 3 includes, in addition to the structure shown in FIG. 1, an unnecessary component (wave) demodulator unit 4, a receive quality measuring unit 8, an amplitude/phase control unit 9, and a multipath erasing unit 10. An unnecessary component eliminating unit is formed by the unnecessary component demodulator unit 4, the receive quality measuring unit 8, the amplitude/phase control unit 9 and the multipath erasing unit 10.

The unnecessary component demodulator unit 4 demodulates an unnecessary component indicated by the transmission path state estimating unit 6. In this regard, the transmission path state estimating unit 6 shown in FIG. 3 has the additional function of informing the unit 4 of the unnecessary component to be demodulated. The receive quality measuring unit 8 measures the receive quality by using input data applied to the decision unit 7 from the multipath erasing unit 10 and demodulated data output by the decision unit 7. The amplitude/phase control unit 9 generates a replica of the multipath to be erased by using the demodulated data from the decision unit 7 and the receive quality information supplied from the receive quality measuring unit 8. The multipath erasing unit 10 erases, by using the information from the unnecessary component demodulator unit 4 and the amplitude/phase control unit 9, a multipath component which affects the demodulation process.

As will be described later, the receive quality measuring unit 8 and the amplitude/phase control unit 9 can be omitted. In this case, the spread spectrum communication receiver includes the unnecessary component demodulator unit 4 and the multipath erasing unit 10 in addition to the structure shown in FIG. 1. Alternatively, the unnecessary component demodulator unit 4 can be omitted. In this case, the spread spectrum communication receiver includes the receive quality measuring unit 8, the amplitude/phase control unit 9 and the multipath erasing unit 10 in addition to the structure shown in FIG. 1.

It should also be noted that the spread spectrum communication device is not limited to the three demodulator units 1–3, but can be equipped with an arbitrary number of demodulator units. Further, the spread spectrum communication device is not limited to the single unnecessary component demodulator unit 4, but can be equipped with an arbitrary number of demodulator units.

A description will be given, with reference to FIGS. 2A, 2B and 2C, of an operation of the spread spectrum communication device shown in FIG. 3.

The received signal 11, which is obtained via an antenna (not shown) and an RF amplifier (not shown), is applied to the demodulator units 1, 2 and 3, the unnecessary component demodulator unit 4, and the transmission path state estimating unit 6. The estimating unit 6 estimates the states of the multiple paths of the transmission (propagation) paths from the received signal 11. More specifically, the estimating unit 6 has a built-in spreading code generator, which generates a spreading code (PN code), which is the same as that used in a transmitter. The estimating unit 6 measures the correlation between the spreading code and the received signal 11. The correlation thus measured indicates estimated receive power levels of the multiple paths and the phases (delays) thereof. The estimating unit 6 controls the demodulator units 1 through 3 and the unnecessary demodulator unit 4 on the basis of the estimated states of the multiple paths.

A further description of the transmission path state estimating unit 6 will be given later.

The paths thus estimated by the estimating unit 6 are allocated to the demodulator units 1 through 3, which perform the demodulation processes on the received signal 11 in synchronism with the phases of the allocated paths. For example, the paths 13, 14 and 15 are respectively allocated to the demodulator units 1, 2 and 3. The demodulator unit 1 demodulates the signal propagated through the path 13 in the symbol interval between T0 and T1 (FIG. 2A), and demodulates the signal propagated through the path 17 in the symbol interval between the times T1 and T2 (FIG. 2B). The relative phase difference equal to zero is given to the demodulator unit 1. The demodulator unit 2 demodulates the signal propagated through the path 14 in the symbol interval between times T0 and T1, and the demodulates the signal propagated through the path 18 in the symbol interval between the times T1 and T2. The relative phase differences of the paths 14 and 18 with respect to the paths 13 and 17 are given to the demodulator unit 2. The spreading code is generated in the demodulator unit 2 with a delay corresponding to the relative phase difference. Similarly, the demodulator unit 3 demodulates the signal propagated through the path 15 in the symbol interval between times T0 and T1, and the demodulates the signal propagated through the path 19 in the symbol interval between the times T1 and T2. The relative phase differences of the paths 15 and 19 with respect to the paths 14 and 18 are given to the demodulator unit 3. The spreading code is generated in the demodulator unit 3 with a delay corresponding to the relative phase difference.

The demodulated signals are output from the demodulator units 1, 2 and 3 and are then applied to the symbol combiner 5. The symbol combiner 5 combines the received demodulated signals in the maximum ratio fashion. The resultant combined signal passes through the multipath erasing unit 10, and is applied to the decision unit 7, which outputs demodulated data.

The transmission path state estimating unit 6 measures the correlation with an unnecessary component propagated through a path which has a delay over one symbol. Then, the estimating unit 6 supplies the unnecessary component demodulator unit 4 with the receive power level of the unnecessary component and the phase thereof. For example, the estimating unit 6 measures the correlation with the received signal propagated through the path 16 shown in FIG. 2C, and supplies the unnecessary component demodulator unit 4 with the receive power level thereof and the relative phase information. In this regard, the unnecessary component demodulator unit 4 performs the demodulation process on the symbol located just prior to the symbol on which the demodulator units 1 through 3 perform the demodulation processes.

The unnecessary component demodulator unit 4 performs the demodulation process on the data which has been discriminated by the decision unit 7. In order to ensure the accurate operation of the unnecessary component demodulator unit 4, it is supplied with the demodulated data from the decision unit 7. The unit 4 refers to the received demodulated data. The detail of the unnecessary component demodulator unit 4 will be described later.

As described above, the unnecessary component demodulator unit 4 demodulates the unnecessary component propagated through the path 16 shown in FIG. 2C, which overlaps with the path 18 of the next symbol interval. However, the unnecessary component demodulator unit 4 does not perform the demodulation process for the cases shown in FIGS. 2A and 2B. In FIG. 2A, there is no path over the symbol interval between the T0 and T1. In FIG. 2B, the path 16 does not overlap with any path in the symbol interval between the times T1 and T2.

The unnecessary component demodulator unit 4 can demodulate the wave propagated through the path 16 which overlaps with the path 18 as shown in FIG. 2C. The multipath erasing unit 10 receives the output signal of the unnecessary component demodulating unit 4 and the output signal of the symbol combiner 5. Then, the multipath erasing unit 10 subtracts the output signal of the unit 4 from the output signal of the symbol combiner 5. Thus, the output signal of the multipath erasing unit 10 to be supplied to the decision unit 7 does not include the unnecessary component.

It should be noted that the receive quality measuring unit 8 and the amplitude/phase control unit 9 do not contribute to the above operation. The following operation of the receiver does not use the unnecessary component demodulator unit 4.

The receive quality measuring unit 8 receives the demodulated signal obtained at the input terminal of the decision unit 7 and the demodulated data obtained at the output terminal thereof, and measures the quality of the demodulated signal. If the demodulated data output by the decision unit 7 has no error, it will be the same as the symbol transmitted by the transmitter, and can be handled as a reference value obtained when the receive quality is excellent. Hence, the difference between the demodulated signal applied to the decision unit 7 and the demodulated data output therefrom depends on the receive quality. When the input and output signals of the decision unit 7 have only a small difference, it can be concluded that the receive quality is relatively good. If the input and output signals of the decision unit 7 have a large difference, it can be concluded that the receive quality is relatively poor. The detail of the receive quality measuring unit 8 will be described later.

The receive quality information thus obtained at the receive quality measuring unit 8 is supplied to the amplitude/phase control unit 9, which is also supplied with the demodulated data from the decision unit 7. Then, the amplitude/phase control unit 9 produces a replica of the unnecessary component contained in the demodulated signal to be applied to the decision unit 7. As will be described in detail later, the amplitude/phase control unit 9 includes an adaptive filter to which the demodulated data from the decision unit is applied. The coefficients of the adaptive filter, that is, the amplitude and phase of the replica, are controlled according to an adaptive algorithm based on the receive quality information supplied from the receive quality measuring unit 8.

The receive quality measuring unit 8 determines that the receive quality is good when the output signal of the symbol combiner 5 does not contain any unnecessary component to be eliminated, as shown in FIG. 2A or FIG. 2B. In this case, the amplitude/phase control unit 9 will produce a very small replica of the unnecessary component in practice, which will not function to degrade the receive quality.

The replica of the unnecessary component is supplied to the multipath erasing unit 10, which subtracts the replica from the output signal of the symbol combiner 5. Hence, the signal to be applied to the decision unit 7 does not contain the unnecessary component.

It can be seen from the above that the unnecessary component eliminating process using the unnecessary component demodulator unit 4 is independent of the unnecessary component eliminating process using the receive quality measuring unit 8 and the amplitude/phase control unit 9.

Hence, it is possible to employ either one of the two eliminating processes. It is also possible to employ both of the eliminating processes. The use of the two eliminating processes will make it possible to more certainly eliminate the unnecessary component. The unnecessary component demodulator unit 4 identifies the unnecessary path, while the combination of the units 8 and 9 does not identify the unnecessary path and may have a reliability slightly less than the reliability obtained when the unnecessary path is identified. Hence, the combination of the two eliminating processes provides higher reliability than that obtained by using only one of the two eliminating processes.

The structure shown in FIG. 3 can be modified so that it has two or more unnecessary component demodulator units 4 when two or more paths in the same symbol interval overlap paths in the subsequent symbol interval.

The receive quality measuring unit 8 and the amplitude/phase control unit 9 can eliminate an unnecessary component located away from the original symbol by two symbols or more.

Figure 4:
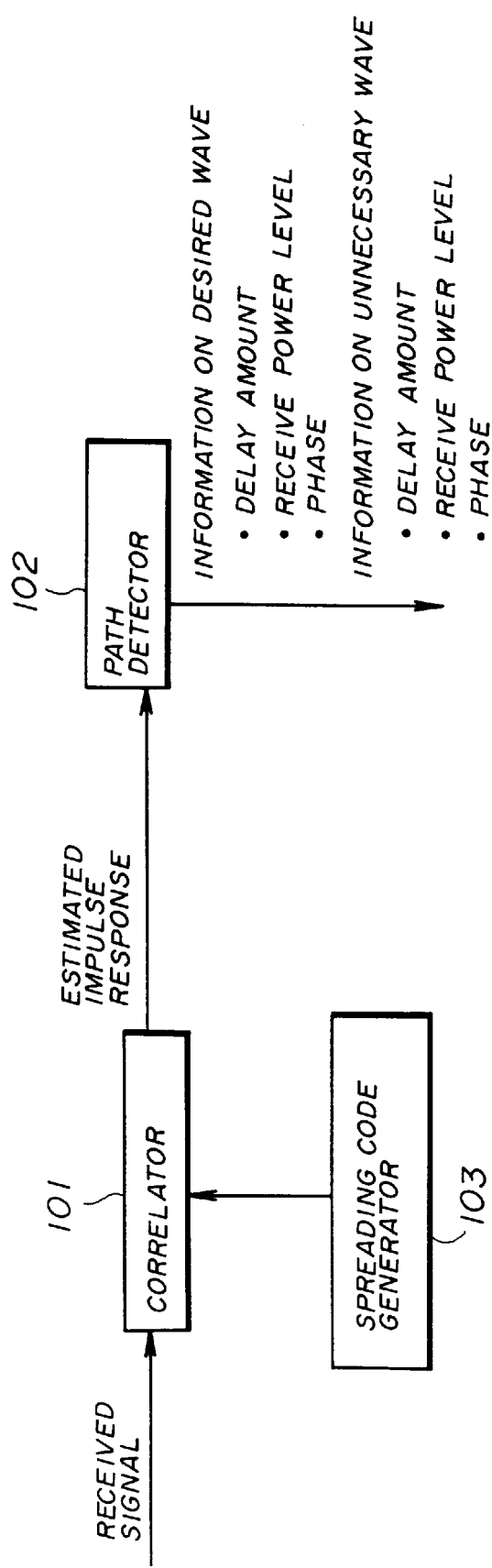
FIG. 4 is a block diagram of a transmission path state estimating unit used in first through third embodiments of the present invention.

FIG. 4 is a block diagram of the transmission path state estimating unit 6 shown in FIG. 3. As shown in FIG. 4, the transmission path state estimating unit 6 includes a correlator 101, a path detector 102 and a spreading code generator 103. The received signal is applied to the correlator 101, which receives a spreading code (PN code) from the spreading code generator 103. The spreading code generated by the spreading code generator 103 is the same as that used at the transmitter. The correlator 101 performs the correlation operation between the spreading code and the received signal. The result of the correlation operation is an estimated impulse response including, for each transmission path, information concerning a level, a phase and a delay which are parameters dependent on the state of the path. The output signal of the correlator 101 is applied to the path detector 102, which separates it into respective path components. More particularly, the path detector 102 separates peaks of a impulse-response train of the estimated impulse response.

Then, the path detector 102 extracts information concerning the level, phase and delay for each of the path components. In other words, the path detector 102 extracts the level, phase and delay of each of the peaks of the impulse-response train. Further, the path detector 102 separates unnecessary components from the desired (necessary) components within the symbol interval. The unnecessary components to be separated are located in a symbol interval which appears after the symbol interval in which the desired components are located. In the above manner, the path detector 102 supplies the demodulator units 1, 2 and 3 with respective information concerning the paths to be processed by these units, more particularly, information concerning the level, phase and delay thereof.

The spreading code generated by the generator 103 has a period longer than one symbol interval in order to estimate an unnecessary path located over the original symbol interval. Further, it is possible to determine whether the unnecessary path overlaps with a path of another symbol by performing a modulo operation on the symbol interval and the delay amount for each of the paths.

Figure 5:
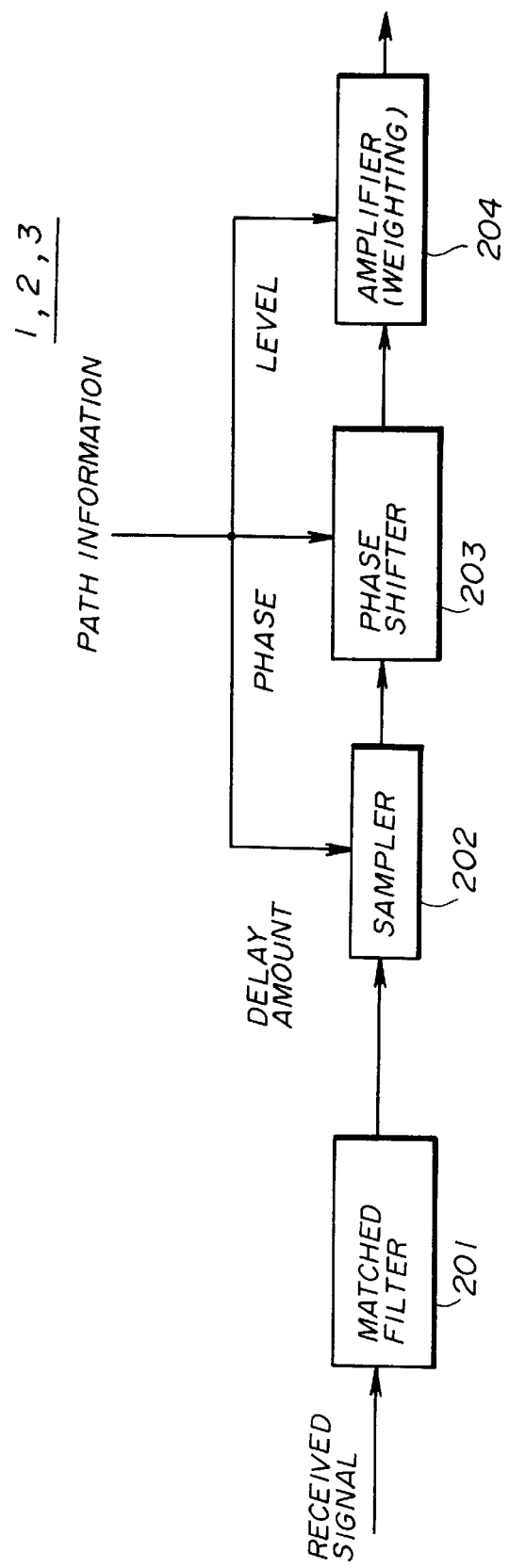
FIG. 5 is a block diagram of a demodulator unit used in the first through third embodiments of the present invention.

FIG. 5 is a block diagram of each of the demodulator units 1, 2 and 3 shown in FIG. 3. Each of the modulator units 1, 2 and 3 includes a matched filter 201, a sampler 202, a phase shifter 203 and a weighting unit 204. The matched filter 201 has the spreading code used at the transmitter and the receiver as a coefficient. Hence, the output signal of the matched filter 201 is a despread signal having a pulse train dependent on the state of the transmission path. The output signal of the matched filter 201 is applied to the sampler 202, which is supplied, from the transmission path state estimating unit 6, with the delay information concerning the path to be demodulated by the demodulator unit. The sampler 201 samples the signal propagated through the path to be demodulated by the demodulator unit once per symbol. The output signal of the sampler 202 is applied to the phase shifter 203, which is supplied, from the transmission path state estimating unit 6, with the phase information concerning the path to be processed by the demodulator unit. The phase shifter 203 rotates, in the reverse direction, the phase of the signal from the sampler 203 by an angle indicated by the phase information. The output signal of the phase shifter 203 is a demodulated signal.

The output signals of the phase shifters 203 of the demodulator units 1 through 3 are demodulated signals in phase with each other.

The output signal of the phase shifter 203 is applied to the weighting unit 204, which can be formed of an amplifier. The weighting unit 204 amplifies the output signal of the phase shifter 203 on the basis of the level information concerning the path to be demodulated by the demodulator unit. It should be noted that the signals of the phase shifters 203 of the demodulator units 1 through 3 have random levels, which can be weighted to desired levels by the weighting units 204 thereof.

FIG. 6 is a block diagram of the unnecessary component demodulator unit 4 shown in FIG. 3. The unnecessary component demodulator unit 4 includes a matched filter 301, a sampler 302, a decision unit 303, a phase shifter 304, and a weighting unit 305. The operations of the matched filter 301, the sampler 302, the phase shifter 304 and the weighting unit 305 are the same as those of the matched filter 201, the sampler 202, the phase shifter 203 and the weighting unit 204 except that the unnecessary component demodulator unit 4 demodulates the unnecessary component or component. The decision unit 303, which is provided between the sampler 302 and the phase shifter 304, makes the symbol decision on the output signal of the sampler 302. The decision unit 303 is supplied with the demodulated data from the decision unit 7 shown in FIG. 3 in order to utilize the already demodulated data and improve the reliability of the symbol decision made in the unnecessary component demodulator unit 4.

FIG. 7 shows the structures of the receive quality measuring unit 8 and the amplitude/phase control unit 9. The receive quality measuring unit 8 includes an adder 401, which calculates the difference between the input signal of the decision unit 7 and the output signal thereof. The demodulated data, which is the output signal of the decision unit 7, can be assumed as the true value of the input signal of the decision unit 7. Hence, the difference between the input and output signals of the decision unit 7 corresponds to an error component contained in the demodulated signal (the input signal of the decision unit 7). The output signal of the adder 401 is input to the amplitude/phase control unit 9 along with the demodulated data from the decision unit 7.

The amplitude/phase control unit 9 includes an adaptive algorithm 402, cascaded delay units 403, amplifiers 404 and an adder 405. The adaptive algorithm 402 utilizes the correlation between the error signal and the demodulated data, and extracts a component resulting from past transmitted data from the error signal. Then, the adaptive algorithm 402 controls the amplifiers 404 on the basis of the extracted component (noise component contained in the input signal of the decision unit 7). The adaptive algorithm 402 is, for example, the known least-mean-square: LMS) adaptive algorithm or the known recursive-least-square: RLS) adaptive algorithm.

The output signal of the decision unit 7 is applied to the delay units 403, each having a delay corresponding to the symbol interval. It is possible to have an arbitrary number of stages of delay units 403 and an arbitrary number of stages of amplifiers 404, taking into consideration the delay of the unnecessary component to be eliminated. If it is desired to eliminate the unnecessary component located in the symbol immediately after the original symbol in which the desired waves exist, one delay unit 403 and one amplifier 404 are used. Similarly, if an unnecessary component resulting from the symbol following, by n symbols, the symbol in which the desired wave exits should be eliminated, n stages of delay units 403 and n stages of amplifiers 404 are used. The tap outputs of the delay units 403 are weighted by the amplifiers 404 in accordance with the output signal of the adaptive algorithm 402. That is, the output signals of the amplifiers 404 are replicas of the unnecessary components which are contained in the demodulated signal and which result from the symbols corresponding to the respective taps. The output signals of the amplifiers 404 are added in the adder 405, which outputs the replicas of all (n) of the unnecessary components contained in the demodulated signal. The output signal of the adder 405 is applied to the multipath erasing unit 10, which erases the unnecessary components from the demodulated signal from the symbol combiner 5.

A description will now be given of a spread spectrum communication receiver according to a second embodiment of the present invention. The second embodiment of the present invention is directed to a demodulation that uses a path which is handled as an unnecessary path for demodulation in the first embodiment of the present invention. For example, the path 16 shown in FIG. 2C is erased in the first embodiment of the present invention. According to the second embodiment of the present invention, the path 16 is used to demodulate the symbol in the symbol interval between the T0 and T1. In order to realize the above, it is necessary to separate the path 16 from the path 18 as in the case of the first embodiment of the present invention.

FIG. 8 is a block diagram of a spread spectrum communication receiver according to the second embodiment of the present invention. In FIG. 8, parts that are the same as those shown in the previously described figures are given the same reference numbers.

The receiver shown in FIG. 8 includes four demodulator units 1, 2, 3 and 24, which can operate in the respective, independent phases. A delay unit 28 functions to delay the received signal 11 by a given time (which corresponds to, for example, one symbol interval). An unnecessary component demodulator unit 29 demodulates an unnecessary component indicated by the amplitude/phase information 12 from the transmission path state estimating unit 6. A provisional decision unit 30 provisionally identifies the symbol of the demodulated unnecessary component supplied from the unnecessary component demodulator unit 29. An amplitude/phase control unit 31 estimates an unnecessary component contained in the desired waves on the basis of the symbol provisionally identified by the provisional decision unit 10, and produces a replica of the unnecessary component. Adders AD1, AD2, AD3 and AD4 function as a multipath erasing unit, and add one or a plurality of replicas of unnecessary components to the demodulated signals from the demodulator units 1, 2, 3 and 24, respectively. The symbol combiner 5 combines the output signals of the adders AD1 through AD4 in the maximum ratio fashion.

It can be seen from the above that an unnecessary component eliminating unit is formed by the units 29, 30 and 31 and the adders AD1–AD4.

It should also be noted that the spread spectrum communication device is not limited to the four demodulator units 1, 2, 3 and 24, but can be equipped with an arbitrary number of demodulator units. Further, the spread spectrum communication device is not limited to the single unnecessary component demodulator unit 29, but can be equipped with an arbitrary number of demodulator units.

It should also be noted that the unit 29 has the same name as the unit 4 shown in FIG. 1, but has a different internal structure from that of the unit 4, as will be seen from the later description. In short, the unnecessary component demodulator unit 29 has a part of the internal structure of the unnecessary component demodulator unit 4.

Figure 9A:
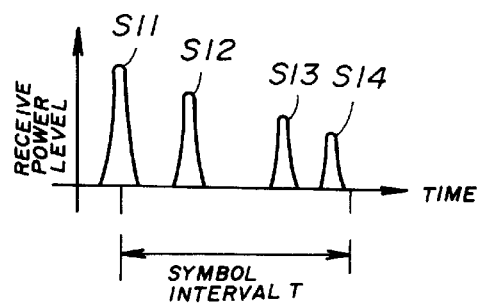
FIGS. 9A, 9B, 9C and 9D are graphs of multipath propagations.
Figure 9B:
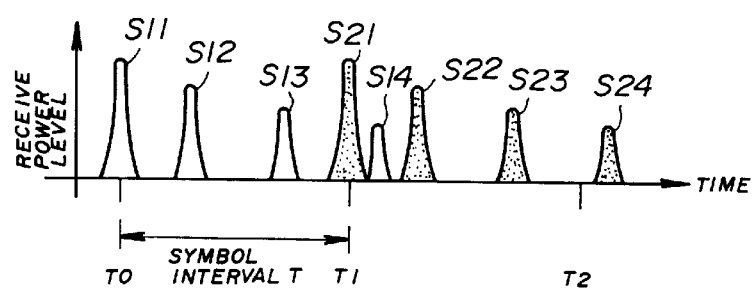
Figure 9C:
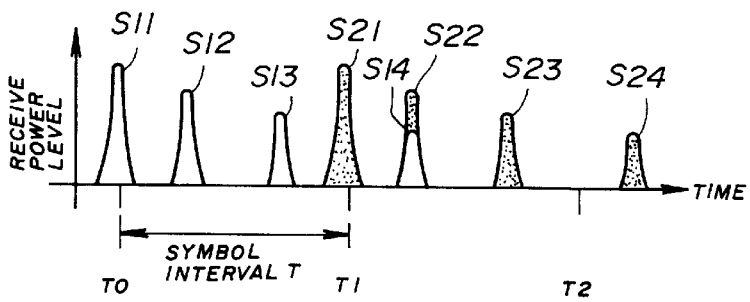

FIGS. 9A, 9B, 9C and 9D show different propagation states. The demodulator units 1, 2, 3 and 24 demodulate the signals propagated through the respective path allocated thereto by the transmission path state estimating unit 6. In FIG. 9A, there are four multiple paths S11, S12, S13 and S14 within one symbol interval T. FIG. 9B shows the correlation levels of the paths S11–S14 of the symbol of time T0, and the correlation levels of paths S21–S24 of the symbol of time T1. The path S14 is located in the symbol interval between times T1 and T2, but does not overlap with any of the paths S21–S24. In FIG. 9C, the path S14 of the symbol of time T0 overlaps with the path S22 of the symbol of time T1. It should be noted that, in the first embodiment of the present invention, the signal propagated through the path S14 shown in FIG. 9C is erased and is not used for the demodulation process on the symbol of time T0.

Figure 9D:
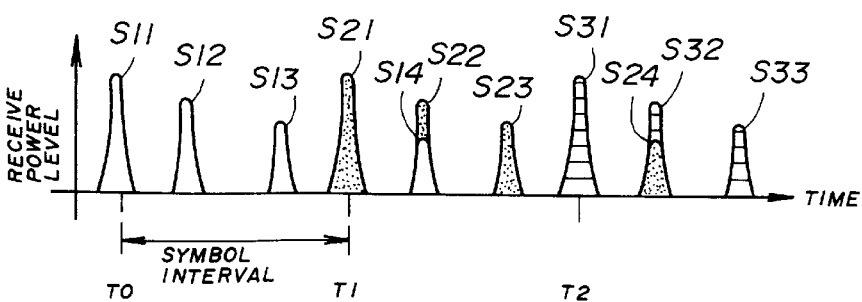

FIG. 9D shows the correlation levels of the paths S11–S14 of the symbol of time T0, the correlation levels of the paths S21–S24 of the symbol of time T2, and the correlation levels of paths S31–S34 of the symbol of time T3. The path S14 of the symbol of time T0 overlaps with the path S22 of the symbol of time T1, and the path S24 of the symbol of time T1 overlaps with the path S32 of the symbol of time T2. According to the present invention, the signal propagated through the path S22 is erased as an unnecessary component to demodulate the symbol of time T0.

A description will now be given of an operation of the spread spectrum communication receiver shown in FIG. 8.

The received signal 11 is applied to the transmission path state estimating unit 6, the delay unit 28 and the unnecessary component demodulator unit 29. The transmission path state estimating unit 6 estimates the receive power level and phase of each of the multiple transmission paths, as has been described previously. Then, the transmission path state estimating unit 6 supplies the amplitude and phase information 12 to the demodulator units 1, 2, 3 and 24, the unnecessary component demodulator unit 29, and the amplitude/phase control unit 31.

The delay unit 28 delays the received signal 11 by the time equal to one symbol interval T, and applies the delayed signal to the demodulator units 1, 2, 3 and 24. The paths estimated by the transmission path state estimating unit 6 are respectively allocated to the demodulator units 1, 2, 3 and 24. The receiver shown in FIG. 8 has four demodulator units 1, 2, 3 and 24, and thus four paths are respectively allocated thereto. For example, in the cases shown in FIGS. 9B, 9C and 9D, the demodulator unit 1 demodulates the signal of the path S11 of the symbol of time T0, the signal of the path S21 of the symbol of time T1, and the signal of the path S31 of the symbol of time T2. The demodulator units 2, 3 and 24 respectively demodulate the signals of the paths S12, S13 and S14 of the symbol of time T0. The demodulator units 2, 3 and 24 respectively demodulate the signals of the paths S22, S23 and S24 of the symbol of time T1. The demodulator units 2, 3 and 24 respectively demodulate the signals of the paths S32, S33 and S34 of the symbol of time T2.

The demodulator units 1, 2, 3 and 24 have respective spreading code generators, which are supplied, from the transmission path state estimating unit 6, with the phase information concerning the paths S11–S14 of the symbol of time T0. The spreading code generators of the demodulator units 1, 2, 3 and 24 generate the spreading codes having the phases indicated by the path information. Similarly, the demodulator units 1, 2, 3 and 24 are supplied with the phase information concerning the paths S21–S24 of the symbol of time T1. The spreading code generators of the demodulator units 1, 2, 3 and 24 generate the spreading codes having the phases indicated by the path information.

The unnecessary component demodulator unit 29 is supplied with the phase information concerning the unnecessary component. For example, the wave propagated through the path S22 is not needed to demodulate the symbol of time T0. The demodulator unit 29 performs the demodulation process on the unnecessary component in the same manner as the demodulator units 1, 2, 3 and 24. It should be noted that the received signal 11 is directly applied to the unnecessary component demodulator unit 29, while the received signal is delayed by the delay unit 28, and is then applied to the demodulator units 1, 2, 3 and 24. Since the delay time of the delay unit 28 is equal to one symbol interval, the unnecessary component demodulator unit 29 performs the demodulation process for the symbol which is one symbol interval after the symbol on which the demodulator units 1, 2, 3 and 24 perform the demodulation process. That is, when the demodulator units 1, 2, 3 and 24 respectively perform the demodulation processes on the paths S11, S12, S13 and S14, the unnecessary component demodulator unit 29 performs the demodulation process on at least one of the paths S21, S22, S23 and S24.

It will be noted that the unnecessary component demodulator unit 29 can be designed to perform the demodulation process on only one path or perform the demodulation process on a plurality of paths, as in the case of the arrangement of the demodulator units 1, 2, 3 and 24. This will be described later.

As described above, when the demodulator units 1, 2, 3 and 24 demodulate the symbol of time T0, the unnecessary component demodulator unit 29 is required to demodulate the symbol of time T1. In order to absorb the above time difference (equal to one symbol interval), the received signal 11 is delayed by the time equal to one symbol interval, and is then applied to the demodulator units 1, 2, 3 and 24.

The demodulated signal obtained by the unnecessary component demodulator unit 29 is applied to the provisional decision unit 10, which provisionally identifies the symbol. The amplitude/phase control unit 31 receives the output signal of the decision unit 30 and the transmission path information 12 indicative of the receive power levels and phases of the signals propagated through the multiple paths, and estimates the amplitude and phase of an unnecessary component which may be included in a signal which is demodulated by the demodulator units 1, 2, 3 and 24.

As has been described previously with reference to FIG. 4, the receive power level (amplitude) and phase of the unnecessary component can be estimated due to the fact that the pattern of the multipath varies slowly as compared with the bit rate of the symbol and thus the pattern of the multipath is repetitive during a certain time. Hence, it is possible to estimate the situations shown in FIGS. 9B, 9C and 9D. Further, the level, phase and delay for each of the path components can be obtained by extracting the level, phase and delay of each of the peaks of the impulse-response train, as has been described previously.

In the case shown in FIG. 9B, the amplitude/phase control unit 31 estimates that an unnecessary component is not included in any of the signals demodulated by the demodulator units 1, 2, 3 and 24, and produces the output signals equal to zero. In the case shown in FIG. 9C, the amplitude/phase control unit 31 estimates that the unnecessary component propagated through the path S22 is included in the signal demodulated by the demodulator unit 24. Then, the amplitude/phase control unit 31 produces a replica of the unnecessary component of the path S22 so that the replica has the same amplitude and phase as those of the unnecessary component of the path S22. In this case, the amplitude/phase control unit 31 estimates that the signals demodulated by the demodulator units 1 through 3 do not include any unnecessary component. Hence, the output signals of the control unit 31 to be applied to the demodulators 1 through 3 are equal to zero.

The replica signals produced by the amplitude/phase control unit 31 are supplied to the adders AD1, AD2, AD3 and AD4, which subtract the replica signals from the output signals of the demodulator units 1, 2, 3 and 24. Hence, the output signals of the adders AD1 through AD4 do not have any unnecessary component.

If a path of the symbol of time T0 overlap with any path of the symbol of time T2, the delay unit 28 will be modified so as to have a delay time equal to two symbol intervals (=2T). By this modification, it is possible to obtain the same advantages as described above.

Figure 10:
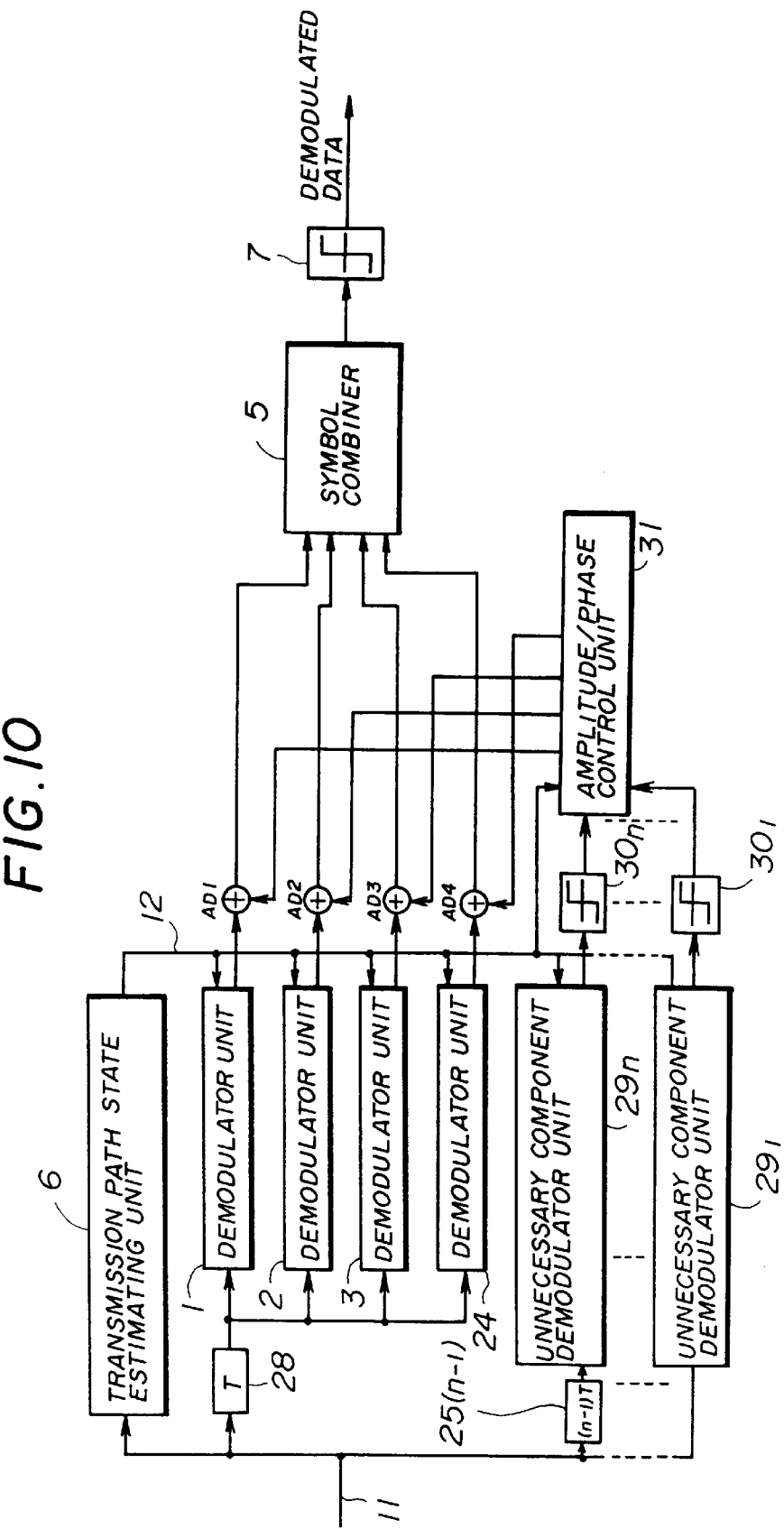
FIG. 10 is a block diagram of a modification of the second embodiment of the present invention.

A description will now be given, with reference to FIG. 10, of a modification of the spread spectrum communication receiver shown in FIG. 8. In FIG. 10, parts that are the same as those shown in FIG. 8 are given the same reference numbers. The modification is directed to eliminating unnecessary components in such a case that paths of the symbol of time T1 overlap with paths of the symbols of times T1 and T2.

Referring to FIG. 10, the spread spectrum communication device includes n unnecessary component demodulator units $29_1$ through $29_n$ (n is an integer), n provisional decision units $30_1$ through $30_n$, and (n−1) delay units $25_1$ through $25_{(n-1)}$. The unnecessary component demodulator unit $29_1$ which demodulates the symbol of time Tn is directly supplied with the received signal 11, and the unnecessary component demodulator unit $29_2$ (not shown for the sake of simplicity) is supplied with the received signal 11 via the delay unit $25_1$ (not shown) having the delay time equal to one symbol interval. Similarly, the unnecessary component demodulator unit $29_i$ (i=1, 2, . . . , n−1) is supplied with the received signal 11 via the delay unit $25_{(i-1)}$ having the delay time equal to (i−1) symbol intervals.

The unnecessary component demodulator unit $29_n$ which demodulates the symbol of time T1 is supplied with the received signal 11 via the delay unit 25(n−1) having the delay time equal to (n−1) symbol intervals. Thus, the received signal 11 is delayed by the delay time equal to (n−1) symbol intervals and is then applied to the unnecessary component demodulator unit $29_n$. The delay unit 28 having the delay time equal to n symbol intervals is provided in front of the demodulator units 1, 2, 3 and 24, which respectively demodulate the symbol of time T0.

If paths of the symbol of time T0 overlaps with a path of the symbol of time T1 and a path of the symbol of time T2, the delay time of the delay unit 28 is set equal to two symbol intervals (2T). Thus, the received signal 11 is delayed by the time equal to two symbol intervals and is then applied to the demodulator units 1, 2, 3 and 24, which demodulate the symbol of time T0. Simultaneously, the received signal 11 is directly applied to the unnecessary component demodulator unit 29$_1$ so that it demodulates the symbol of time T2. At this time, the unnecessary component demodulator unit 29$_2$ is supplied with the delayed received signal via the delay unit 25$_1$ having the delay time equal to one symbol interval (T). Thus, the transmission path information concerning the four paths of the symbol of time T1 is applied to the amplitude/phase control unit 31 from the demodulator units 1, 2, 3 and 24. Further, the transmission path information concerning one unnecessary path of the symbol of time T1 is applied to the amplitude/phase control unit 31 from the unnecessary component demodulator unit 29$_2$. Furthermore, the transmission path information concerning one unnecessary path of the symbol of time T2 is applied to the amplitude/phase control unit 31 from the unnecessary component demodulator unit 29$_1$.

The amplitude/phase control unit 31 produces replicas of the unnecessary components to be eliminated from two of the four demodulated signals from the demodulator units 1, 2, 3 and 24, and applies the replicas to the corresponding adders. Hence, the two unnecessary components with respect to the symbol of time T0 can be eliminated. In the above case, the unnecessary component demodulator units 29$_3$ through 29$_n$ are not required.

In the above-mentioned manner, it is possible to eliminate, by adjusting the number of the units 29$_1$–29$_n$ and the number of provisional decision units 30$_1$–30$_n$ and the delays of the delay units 28 and 25$_1$–25$_{(n-1)}$, the unnecessary components and realize the highly reliable receiver irrespective of the number of unnecessary components and the positions thereof.

Figure 11A:
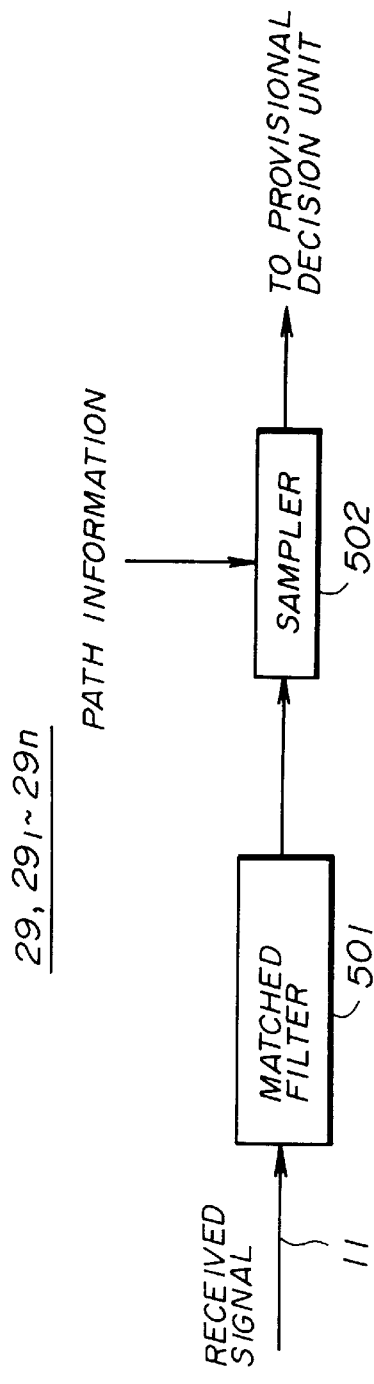
FIGS. 11A and 11B are block diagrams of an unnecessary component demodulator units used in the second embodiment of the present invention and the modification thereof.

FIG. 11A is a block diagram of a first example of the structure of the unnecessary component demodulator units 29, 29$_1$–29$_n$. The structure shown in FIG. 11A includes a matched filter 501 and a sampler 502, which correspond to the aforementioned matched filter 301 and sampler 302 shown in FIG. 6. The received signal 11 is applied to the matched filter. The sampler 502 is supplied with the delay information concerning the unnecessary component to be eliminated from the transmission path state estimating unit 6.

Figure 11B:
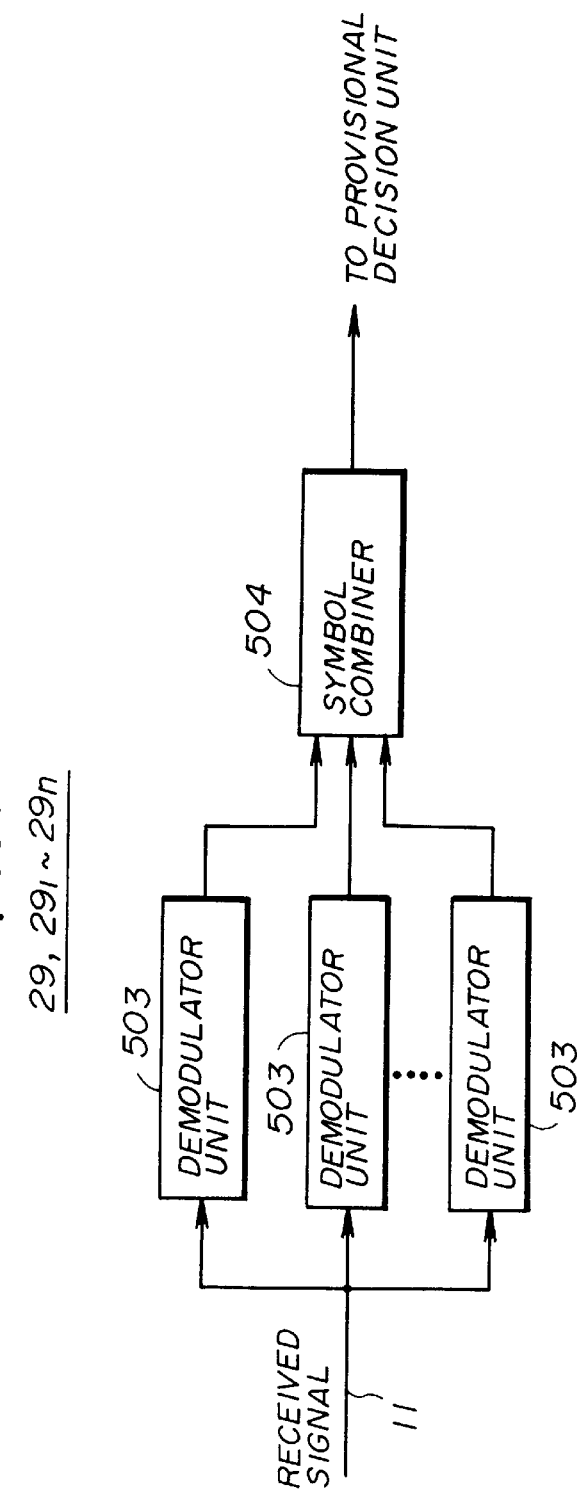

FIG. 11B is a block diagram of a second example of the structure of the unnecessary component demodulator units 29, 29$_1$–29$_n$. The structure shown in FIG. 11B corresponds to a RAKE receiver made up of demodulator units 503 and a symbol combiner 504.

Figure 12:
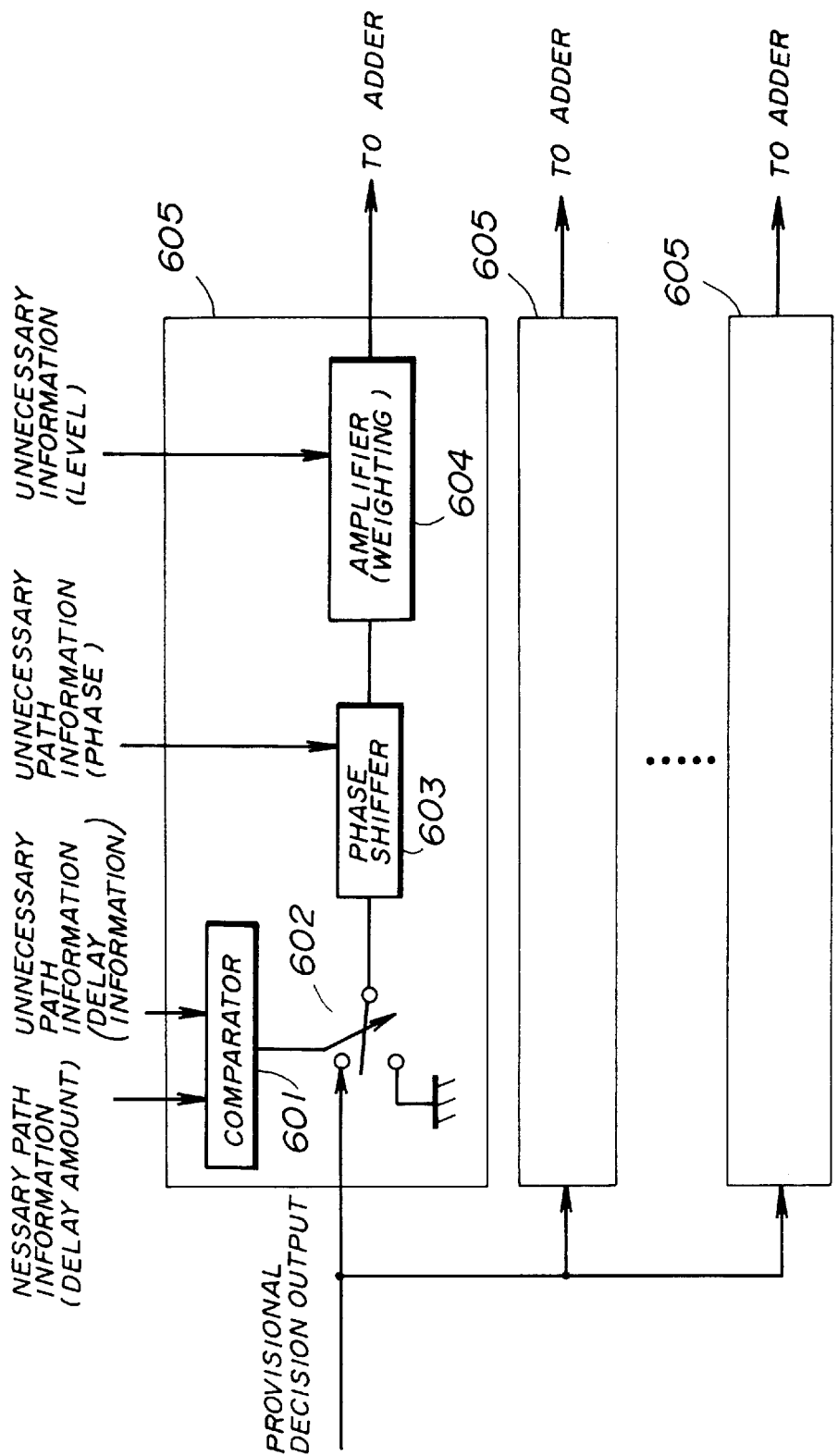
FIG. 12 is a block diagram of an amplitude/phase control unit used in the second embodiment of the present invention and the modification thereof.

FIG. 12 is a block diagram of the amplitude/phase control unit 31 shown in FIG. 8. The unit 31 has a plurality of amplitude/phase controllers 605 equal in number to the demodulator units 1, 2, 3 and 24. Each of the controllers 605 is made up of a comparator 601, a switch 602, a phase shifter 603 and an amplifier 604. The comparator 601 receives, from the transmission path state estimating unit 6, the delay information (the delay amount) concerning the corresponding desired wave (component) and the delay information concerning the unnecessary component. The comparator 601 compares the received delay amounts, and determines whether the unnecessary component overlaps with the desired component. The result of this determination controls the switch 602. If the unnecessary component overlaps with the desired component, the comparator 601 allows the provisional decision signal to be applied to the phase shifter 603. If the unnecessary component does not overlap with the desired component, the comparator 601 controls the switch 602 to apply the ground level (corresponding to a value of zero) to the phase shifter 603.

The phase shifter 603 refers to the phase information concerning the unnecessary component supplied from the transmission path state estimating unit 6, and shifts (rotates) the phase thereof so that the phase of the provisional decision signal coincides with the phase of the unnecessary component contained in the demodulated signal output by the corresponding demodulator unit. The output signal of the phase shifter 603 is applied to the amplifier 604, which is supplied with the level (amplitude) information concerning the unnecessary component. The amplifier 604 amplifies the output signal of the phase shifter 603 so that the amplitude thereof becomes equal to that of the unnecessary component contained in the demodulated signal output by the corresponding demodulator unit. The output signal of the amplifier 604 is applied to the corresponding one of the adders AD1 through AD4.

When the ground level is applied to the phase shifter 603, the output signal of the amplifier 604 is zero, so that no problem will occur.

The amplitude/phase control unit 31 shown in FIG. 10 has a plurality of structures, each being the same as that shown in FIG. 12. The output signals of the structures are subjected to an OR operation, and the result of the OR operation is applied to the corresponding adder.

It should be noted that, in FIG. 9D, the path S14 of the symbol of time T0 overlaps with the path S22 of the symbol of time T1 and the path S24 of the symbol of time T2 overlaps with the path S32 of the symbol of time T2. When the symbol of time T1 is demodulated, it is necessary to erase the signal of the path S14 of the symbol of time T0 which overlaps with the path S22 and to erase the signal of path S32 which overlaps with the path S24 of the symbol of time T2. This can be accomplished by the combination of the aforementioned first and second embodiments of the present invention. The above combination will be described below as a third embodiment of the present invention.

Figure 13:
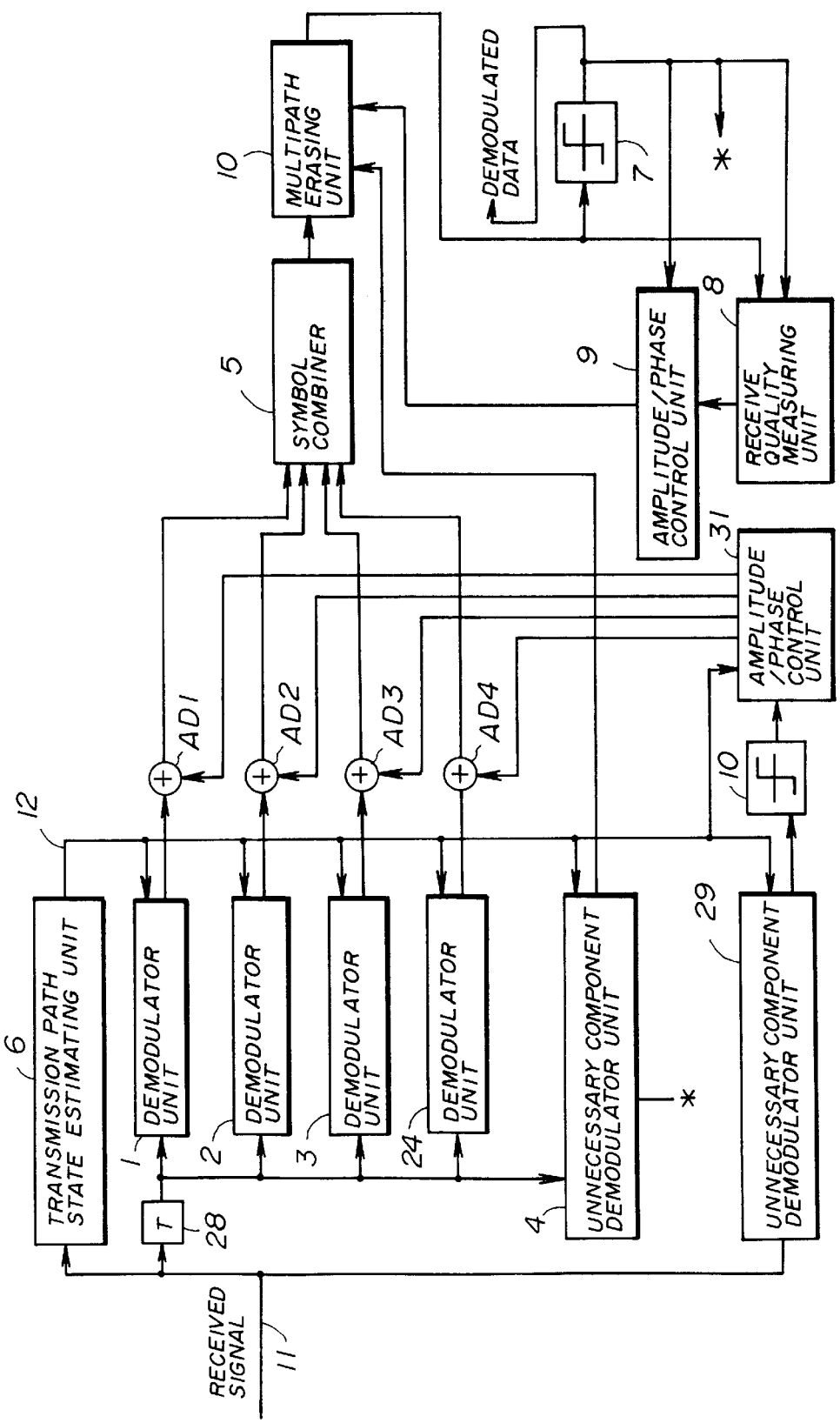
FIG. 13 is a block diagram of a spread spectrum communication receiver according to the third embodiment of the present invention.

FIG. 13 is a block diagram of the third embodiment of the present invention. In FIG. 13, parts that are the same as those shown in the previously described figures are given the same reference numbers.

All the structural components and mutual relationships therebetween have been described, and therefore a description thereof will be omitted here.

In operation, the path S32 which overlaps with the path S24 of the symbol of time T2 can be erased by the circuit portion of the receiver shown in FIG. 13 corresponding to the second embodiment of the present invention. The path S14 which overlaps with the path S22 of the symbol of time T0 can be erased by the circuit portion of the receiver shown in FIG. 13 corresponding to the first embodiment of the present invention.

It should be noted that the receive quality measuring unit 8 and the amplitude/phase control unit 9 can be omitted, as has been described previously. Alternatively, the unnecessary component demodulator unit 4 can be omitted, as has been described previously.

It is also possible to combine the structure shown in FIG. 10 with the structure shown in FIG. 3.

The present invention is not limited to the specifically disclosed embodiments, and variations and modifications may be made without departing from the scope of the present invention.

What is claimed is:

1. A spread spectrum communication receiver comprising:
- a transmission path state estimating unit-which estimates states of paths from a received signal;
- demodulator units independently performing demodulation processes on signals propagated through the respective paths;
- a symbol combiner combining output signals of said demodulator units;
- a decision unit which is directly or indirectly coupled to said symbol combiner and makes a decision on an output signal of said symbol combiner;
- an unnecessary component eliminating unit eliminating a component of a first symbol which is an unnecessary component that is propagated through one of the paths and overlaps with a received component of a second symbol to be demodulated, so that the unnecessary component has been eliminated from the output signal of the decision unit; wherein said unnecessary component eliminating unit comprises:
  - an unnecessary component demodulator unit demodulating the unnecessary component by referring to estimated states of the paths and the output signal of said decision unit; and
  - an erasing unit subtracting an output signal of said unnecessary component demodulator unit from the output signal of said symbol combiner.

2. The spread spectrum communication receiver as claimed in claim 1, wherein the first symbol of the unnecessary component leads, on a time basis, the second symbol of the received component to be demodulated.

3. The spread spectrum communication receiver as claimed in claim 1, further comprising a delay unit which delays the received signal by a given delay time and applies a delayed received signal to said demodulator units,
wherein said unnecessary component eliminating unit comprises:
  - an unnecessary component demodulator unit directly receiving the received signal and demodulating the unnecessary component included therein by referring to estimated states of the paths;
  - a provisional decision unit which makes a provisional decision on an output signal of said unnecessary component demodulator unit;
  - a control unit generating a replica of the unnecessary component by using a output signal of the provisional decision unit and the estimated states of the paths; and
  - an erasing unit subtracting said replica generated by said control unit from the output signals of said demodulator units.

4. The spread spectrum communication receiver as claimed in claim 3, wherein said given delay time is equal to at least one symbol interval.

5. The spread spectrum communication receiver as claimed in claim 4, further comprising a first delay unit which delays the received signal by a given delay time and applies a delayed received signal to said demodulator units,
wherein said unnecessary component eliminating unit comprises:
  first through (n−1)th delay units that respectively delay the received signal by respective given delay times, where n is an integer, and an ith delay unit (i=1, 2, ..., (n−1)) has a delay time equal to i times a symbol interval;
  - a first unnecessary component demodulator unit directly receiving the received signal and demodulating an unnecessary component included therein by referring to estimated states of the paths;
  - second through nth unnecessary component demodulator units respectively receiving the received signal via the first through (n−1)th delay units and demodulating unnecessary components included in the received signal by referring to estimated states of the paths;
  - n provisional decision units which make provisional decisions on output signals of said first through nth unnecessary component demodulator units;
  - a control unit generating replicas of the unnecessary components by using output signals of the n provisional decision units and the estimated states of the paths; and
  - an erasing unit subtracting said replicas generated by said control unit from the output signals of said demodulator units.

6. The spread spectrum communication receiver as claimed in claim 5, wherein said given delay time is equal to n times the symbol interval.

7. The spread spectrum communication receiver as claimed in claim 5, wherein the first symbol of the unnecessary component lags, on a time basis, behind the second symbol of the received component to be demodulated.

8. The spread spectrum communication receiver as claimed in claim 1, further comprising a delay unit which delays the received signal by a given delay time and applies a delayed received signal to said demodulator units,
wherein said unnecessary component eliminating unit comprises:
  - a first unnecessary component demodulator unit demodulating a first unnecessary component by referring to estimated states of the paths and the output signal of said decision unit;
  - a first erasing unit subtracting an output signal of said first unnecessary component demodulator unit from the output signal of said symbol combiner;
  - a second unnecessary component demodulator unit directly receiving the received signal and demodulating a second unnecessary component included therein by referring to the estimated states of the paths;
  - a provisional decision unit which makes a provisional decision on an output signal of said second unnecessary component demodulator unit;
  - a control unit generating a replica of the second unnecessary component by using an output signal of the provisional decision unit and the estimated states of the paths; and
  - a second erasing unit subtracting said replica generated by said control unit from the output signals of the said demodulator units.

9. The spread spectrum communication receiver as claimed in claim 1, further comprising a delay unit which delays the received signal by a given delay time and applies a delayed received signal to said demodulator units,
wherein said unnecessary component eliminating unit comprises:
  - a receive quality measuring unit measuring a receive quality by using an output signal of a first erasing unit and the output signal of the decision unit;
  - a first control unit generating a replica of a first unnecessary component by using the output signal of said decision unit and the receive quality measured by said receive quality measuring unit;

said first erasing unit subtracting the replica generated by said first control unit from the output signal of said symbol combiner;

an unnecessary component demodulator unit directly receiving the received signal and demodulating a second unnecessary component included therein by referring to estimated states of the paths;

a provisional decision unit which makes a provisional decision on an output signal of said unnecessary component demodulator unit;

a second control unit generating a replica of the second unnecessary component by using an output signal of the provisional decision unit and the estimated states of the paths; and a second erasing unit subtracting the replica generated by said second control unit from the output signals of said demodulator units.

10. The spread spectrum communication receiver as claimed in claim 1, further comprising a delay unit which delays the received signal by a given delay time and applies a delayed received signal to said demodulator units, wherein said unnecessary component eliminating unit comprises:
a first unnecessary component demodulator unit demodulating a first unnecessary component by referring to estimated states of the paths and the output signal of said decision unit;

a receive quality measuring unit measuring a receive quality by using an output signal of a first erasing unit and the output signal of the decision unit;

a first control unit generating a replica of the first unnecessary component by using the output signal of the decision unit and the receive quality measured by said receive quality measuring unit;

said first erasing unit subtracting, from the output signal of said symbol combiner, the replica generated by said first control unit and an output signal of said first unnecessary component demodulator unit;

a second unnecessary component demodulator unit directly receiving the received signal and demodulating a second unnecessary component included therein by referring to the estimated states of the paths;

a provision decision unit which makes a provisional decision on an output signal of said second unnecessary component demodulator unit;

a second control unit generating a replica of the second unnecessary component by using an output signal of the provisional decision unit and the estimated states of the paths; and a second erasing unit subtracting said replica generated by said second control unit from the output signals of said demodulator units.

11. A spread spectrum communication receiver comprising:

a transmission path state estimating unit which estimates states of paths from a received signal;

demodulator units independently performing demodulation processes on signals propagated through the respective paths;

a symbol combiner combining output signals of said demodulator units;

a decision unit which is directly or indirectly coupled to said symbol combiner and makes a decision on an output signal of said symbol combiner;

an unnecessary component eliminating unit eliminating a component of a first symbol which is an unnecessary component that is propagated through one of the paths and overlaps with a received component of a second symbol to be demodulated, so that the unnecessary component has been eliminated from the output signal of the decision; wherein said unnecessary component eliminating unit comprises:

a receive quality measuring unit measuring a receive quality by using an output signal of an erasing unit and the output signal of the decision unit;

a control unit generating a replica of the unnecessary component by using the output signal of the decision unit and the receive quality measured by said receive quality measuring unit; and said erasing unit subtracting the replica generated by said control unit from the output signal of said symbol combiner.

12. A spread spectrum communication receiver comprising:

a transmission path state estimating unit which estimates states of paths from a received signal:

demodulator units independently performing demodulation processes on signals propagated through the respective paths;

a symbol combiner combing output signals of said demodulator units;

a decision unit which is directly or indirectly coupled to said symbol combiner and makes a decision on an output signal of said symbol combiner, an unnecessary component eliminating unit eliminating a component of a first symbol which is an unnecessary component that is propagated through one of the paths and overlaps with a received component of a second symbol to be demodulated, so that the unnecessary component has been eliminated from the output signal of the decision unit, wherein said unnecessary component eliminating unit comprises:

an unnecessary component demodulator unit demodulating the unnecessary component by referring to estimated states of the paths and the output signal of said decision units;

a receive quality measuring unit measuring a receive quality by using an output signal of an erasing unit and the output signal of the decision unit;

a control unit generating a replica of the unnecessary component by using the output signal of the decision unit and the receive quality measured by the receive quality measuring unit; and said erasing unit subtracting the replica generated by the control unit from the output signal of the symbol combiner.

* * * * *